United States Patent [19]

Cloetens et al.

[11] Patent Number: 4,723,026
[45] Date of Patent: Feb. 2, 1988

[54] PREPARATION OF POLYMER POLYOLS

[75] Inventors: Rudolphe C. Cloetens; Werner A. Lidy, both of Geneva; Huy P. Thanh, Onex, all of Switzerland

[73] Assignee: BP Chemicals Limited, London, England

[21] Appl. No.: 807,512

[22] PCT Filed: Apr. 24, 1985

[86] PCT No.: PCT/GB85/00176
§ 371 Date: Nov. 22, 1985
§ 102(e) Date: Nov. 22, 1985

[87] PCT Pub. No.: WO85/04891
PCT Pub. Date: Nov. 7, 1985

[30] Foreign Application Priority Data

Apr. 24, 1984 [GB] United Kingdom ............... 8410480

[51] Int. Cl.$^4$ .............................. C07F 7/08; C07F 7/18
[52] U.S. Cl. ...................................... 556/444; 556/446
[58] Field of Search ................................. 556/444, 446

[56] References Cited

U.S. PATENT DOCUMENTS

| 2,777,868 | 1/1957 | Mixer et al. | 556/446 |
| 2,777,869 | 1/1957 | Bailey et al. | 556/446 |
| 3,317,369 | 5/1967 | Clark et al. | 556/446 X |
| 3,931,266 | 1/1976 | Foley et al. | 556/444 |
| 4,093,554 | 6/1978 | Jayne et al. | 556/444 X |
| 4,160,776 | 7/1979 | Scardera et al. | 556/446 |
| 4,304,875 | 12/1981 | Duvernay et al. | 556/446 X |
| 4,467,105 | 8/1984 | Kötzsch et al. | 556/444 |
| 4,490,416 | 12/1984 | Westall et al. | 556/446 X |
| 4,501,911 | 2/1985 | Koerner et al. | 556/446 |
| 4,588,830 | 5/1986 | Fisk et al. | 556/52 |

Primary Examiner—Paul F. Shaver
Attorney, Agent, or Firm—Brooks Haidt Haffner & Delahunty

[57] ABSTRACT

A novel family of modified polyols suitable for use in the preparation of fluid polymer/polyols. The modified polyols are the reaction product obtained by reacting a silicon atom containing compound with an unmodified polyol, the silicon atom compound being one which has (a) at least olefinically unsaturated hydrocarbyl group and (b) at least one functional group which is reactable with the hydroxy groups on the polyol. Examples of such silicon atom containing compounds include vinyltriethoxysilane and vinyltrimethoxysilane. Modified polyols of the type described are particularly useful in the preparation of polymer/polyols containing high levels of polymer since they reduce the viscosity of the final polymer/polyol and decrease the tendency of the polymer/polyol to produce polymer sediment.

8 Claims, No Drawings

PREPARATION OF POLYMER POLYOLS

The present invention relates to novel polyether polyols which can be used in the preparation of polymer/polyols, sometimes termed polymeric polyols or graft polyols. The present invention also relates to processes by which such modified polyether polyols are prepared and to processes which use the polymer/polyols derived from the modified polyether polyols. In particular, the present invention relates to novel modified polyether polyols and their use in the above applications.

The reaction between a polyfunctional isocyante and a polyfunctional alcohol to produce polyurethane foams, elastomers, resins and the like is a well known chemical reaction which is commercially exploited on a large scale. Commercial polyurethane manufacture in general involves the reaction between a polyfunctional isocyanate and a polyfunctional alcohol such as a polyether polyol. Such polyether polyols are made from a polyfunctional low molecular weight alcohol onto which has been added a polyalkylene oxide chain. The polyalkylene oxide chain is typically prepared as a copolymer of ethylene oxide, propylene oxide or a mixture thereof in a random or block form.

In recent years, the use of polyether polyols of the type described above has been in some areas superseded by polyether polyols containing additional polymeric matter. These polyether polyols, known as polymer/polyols have been described in U.S. Pat. No. 3,304,273, U.S. Pat. No. 3,383,351, U.S. Pat. No. Re. 28,715 and U.S. Pat. No. Re. 29,118. Typically, these polymer/polyols have been prepared by polymerising one or more olefinically unsaturated monomers dispersed in the polyether polyol in the presence of a free radical catalyst. The polymer/polyols produced by these processes, which are thought to comprise a polymer or copolymer of the monomers at least partially grafted to the polyether polyol, have the important advantage of importing to any polyurethane derived from them improved load-bearing properties as compared with polyether polyols having no additional polymer.

The need to obtain polyurethanes with further improved load-bearing properties has meant that recently attempts have been made to improve polymer/polyols further. In particular developments of polymer/polyols has centred around increasing the polymer content whilst still maintaining the polymer/polyol in the form of a low viscosity fluid having an acceptable resistance to polymer sedimentation and increasing the polystyrene content of the polymer in order to remove problems associated with "scorch".

In order to produce stable low viscosity polymer polyols, it has been proposed to introduce during the polymerisation an extra component often termed a non aqueous dispersant (NAD) stabiliser. The NAD stabiliser comprises a polyol, for example a polyether polyol, containing deliberately added unsaturation which is able to copolymerise with or graft onto the growing polymer chains thereby forming a steric hinderance which prevents the agglomeration of polymer particles.

An example of such an NAD stabiliser is given in U.S. Pat. No. 3,823,201 where there is disclosed an unsaturated polyether polyol obtained by the reaction of a polyether polyol with the anhydride of an unsaturated acid, for example maleic anhydride. In this case, the anhydride of the unsaturated acid reacts with a free hydroxyl group on the polyether polyol to produce a modified polyether polyol having from about 0.10 to 0.70 mole of unsaturation per mole of polyol.

Similar methods of introducing unsaturation into a polyether polyol thereby a NAD stabiliser are disclosed in U.S. Pat. No. 4,198,488, GB Pat. No. 1,411,646 and EP Pat. No. 6605.

It has now been found that polymer/polyols having favourable viscosity and resistance to polymer sedimentation at high polymer content can be prepared by polymerising one or more monomers having olefinic unsaturation in a polyether polyol containing a novel NAD stabiliser. The novel NAD stabilisers have the advantage that they are easily prepared in a short time under mild reaction conditions. Such NAD stabilisers also obviate the need for an alkylene oxide capping step as is required when unsaturation is introduced via maleic anhydride.

Accordingly, the present invention provides a modified alcohol suitable for use as an NAD stabiliser characterised in that the modified alochol is the reaction product obtained by reacting an alcohol with a silicon atom containing compound having at least one olefinically unsaturated functional group and at least one functional group attached to the silicon atom which is reactable with the hydroxyl groups on the alcohol.

The alcohols used in the preparation of the NAD stabiliser can be for example polyalkylene polyether monols or polyols, polyhydroxyl containing polyesters, polyhydroxy terminated polyurethane polymers, polyhydric polythioethers, and the like. A preferred class of polyol is the polyalkylene polyether polyols, usually called polyether polyols, of which the following subclasses are the most preferred (a) alkylene oxide adducts of non-reducing sugars and their derivatives.
(b) alkylene oxide adducts of polyphenols
(c) alkylene oxide adducts of polyhydroxyalkanes.

The polyether polyol used should have a number average molecular weight in excess of 400 and a hydroxyl number in the range 20 to 280. Terms such as number average molecular weight and hydroxyl number will be familiar to those skilled in the art.

Most preferably the polyether polyol is a poly(ethylene oxide and/or propylene oxide) adduct of one of the following polyhydric alcohols; glycerol, trimethylolpropane, diethylene glycol, the isomeric butanetriols, pentanetriols and hexanetriols and pentaerythritol.

The silicon compound which is used to introduce olefinic unsaturation into the alcohol is a silicon containing compound having at least one olefinically unsaturated functional group and at least one functional group, which is reactable with the hydroxyl groups on the alcohol, attached to the silicon atom or one of the silicon atoms present in the compound if more than one silicon atom is present.

A preferred class of such silicon compounds is that having the generic formula $R_nSi(X)_{4-n}$ where;

(a) n is an integer from 1-3,
(b) the R groups are independently saturated or unsaturated hydrocarbyl groups and where at least one R group is an olefinically unsaturated hydrocarbyl group.
(c) the X groups are independently functional groups which are reactable with the hydroxyl groups on the polyol.

As regards the saturated hydrocarbyl groups, these can be alkyl or cycloalkyl groups or even aryl groups since in general any unsaturation present in such groups will be unreactive. Preferably the saturated hydrocarbyl groups are selected from $C_1$-$C_{20}$ linear or branched alkyl groups, cycloalkyl groups having between 4 and 20 carbon atoms in the ring and substituted or unsubstituted phenyl or benzyl groups.

The unsaturated hydrocarbyl groups are ones having olefinic unsaturation and include $C_1$-$C_{20}$ alkenyl groups, for example vinyl groups, propenyl groups, butenyl groups, pentenyl groups and the like, as well as cycloalkenyl groups and olefinically substituted aryl groups. Unsaturated hydrocarbyl groups having more than one unit of olefinic unsaturation e.g. butadienyl groups can also be used.

As mentioned earlier, the X groups are functional groups which are reactable with the hydroxyl groups on the alcohol. Any functional group which can be made to react either directly or indirectly with a hydroxyl group can be used providing that the conditions required to engineer such a reaction are not such that either the polyol or the silicon compound is chemically or thermally degraded. Functional groups capable of reacting with the hydroxyl groups on the polyol include alkoxy groups, preferably $C_1$-$C_{10}$ alkoxyl groups, halide groups, carbamic acid ester groups of formula —$NHCO_2Z$ where Z is a hydrocarbyl radical and —OY groups where Y is a halogen. Of these X groups, the $C_1$-$C_{10}$ alkoxy groups are the most preferred.

Suitable examples of the silicon compounds of the class described above therefore include vinyltrialkoxysilanes e.g. vinyltriethoxysilane, vinyltrimethoxysilane and vinyltripropoxysilane, alkyl vinyldialkoxysilanes e.g. methvinyl diethoxysilane, dialkylvinylalkoxysilanes, alkyldivinylalkoxysilanes and the like.

In the Examples given above, the carbon carbon double bond, which is the source of the olefinic unsaturation, is bonded directly to the silicon atom. The carbon carbon double bond can, however, also be bonded to the silicon atom through other atoms as in for example the vinylsilane stabiliser methacryloxypropyl trimethoxysilane.

In addition to the preferred class of silicon atom containing compounds described above, those compounds having the generic formula $R_mSi((—OSi(R^1)_2)_pX)_{4-n}$ can also be used. In the above formula R,X and n are as described previously, p is an integer greater than zero and $R^1$ is a hydrocarbyl group. An example of such as stabiliser is $CH_2=CH_2Si((—OSi(CH_3)_2)_pOCH_3)_3$.

The NAD stabiliser produced from the alcohol and the silicon atom containing compound has preferably a viscosity in the range 500–4000 cps at 25° C. In addition the NAD stabiliser should have less than 0.8% by weight, preferably 0.3 to 0.7% by weight induced unsaturation.

In a further aspect of the invention described above there is provided a process for the preparation of the NAD stabiliser by reacting the silicon compound with the polyol. Typically this reaction is carried out by heating the silicon compound and polyol together at temperature in the range 60° to 160° C., preferably 100° to 120° C., optionally in an inert solvent such as cyclohexane or toluene. In the case where the X groups on the silicon compound are alkoxy groups or carbamic acid ester groups, it is preferable to carry out the reaction in the presence of a transesterification or transetherification catalyst for example an acid such as a mixture of trifluoroacetic acid and sodium acetate or a base such as an amidine or guanidine. When an acid catalyst is used it may be necessary to add a neutralising agent, for example sodium bicarbonate, at the end of the reaction.

As mentioned earlier, the NAD stabilisers described above are particularly useful for preparing polymer/polyols containing high levels of polymer. Thus in another aspect of the present invention there is provided a process for the preparation of a fluid polymer/polyol which process comprises polymerising one or more monomers in a liquid polyol under polymerisation conditions and in the presence of a free radical catalyst characterised in that the liquid polyol comprises (1) a base polyol and (2) an NAD stabiliser of the type described above.

The base polyol used in the preparation of the fluid polymer/polyol may be any of the polyols described earlier in relation to the NAD stabiliser or a mixture of such polyols. The base polyols should have viscosities in the range 100–5000 centipoise at ambient temperature, preferably in the range 100–2000 centipoises.

During the preparation of the polymer/polyol, a polymer is produced in the liquid base polyol by polymerisation of the monomer or monomers. The monomers used are suitably vinyl monomers, for example, styrene, acrylonitrile, methacrylonitrile and methyl methacrylate. Preferably a mixture of styrene and acrylonitrile are used to produce a copolymer. The final polymer/polyol is suitably one having more than 20% by weight polymer present and is preferably one having between 30 and 70% by weight polymer. As regards the relative amounts of styrene and acrylonitrile in the copolymer it is desirable for reasons of cost and to reduce scortch to be able to maximise the level of styrene present. Preferably therefore the copolymer should contain between 50 and 100% styrene on a molar basis.

The polymerisation reaction, for example between acrylonitrile and styrene, is initiated by means of a free radical initiator. The free radical initiator can be any of those which are routinely used in vinyl polymerisation processes including peroxides, perborates, persulphates, percarbonates and azo compounds. Typical examples of such free radical initiators include alkyl and aryl hydroperoxides, dialkyl and diaryl peroxides, dialkyl peroxy dicarbonates and azobis(nitriles). Preferred free radical initiators are azobis(isobutyronitrile) and bis(4-tertbutylcyclohexyl)peroxydicarbonate (Perkadox).

The polymer/polyols produced using the NAD stabilisers of the present invention are useful in the preparation of polyurethanes, particularly polyurethane foams. Such polyurethane foams have improved tensile strength and load bearing without impairment of the other physical parameters associated with the product. Accordingly there is also provided a process for the production of a polyurethane foam by reacting a polyfunctional isocyanate with a polymer/polyol of the type described above in the presence of
(a) a catalyst for the urethane forming reaction,
(b) a blowing agent and
(c) a foam stabiliser Polyfunctional isocyanates which can be used to advantage include diisocyanatoalkanes, e.g. 1,2-diisocyanatoethane, 1,3-diisocyanates, the isomeric benzene, xylene and toluene diisocyanates, MDI and the like.

Catalysts which can be used to accelerate the urethane forming reaction will likewise be familiar to those skilled in the art. These include amines, phosphines, strong inorganic bases, titanate, silicate and stannate esters and organo tin derivatives.

As regards blowing agents and foam stabiliser the range of materials which can be used will be familiar to the skilled man. Thus, suitable blowing agents include water and halogenated hydrocarbons of low molecular weight.

The process may be carried out batchwise or continuously.

The invention is now illustrated by the following examples.

EXAMPLE 1

Vinyltriethoxy silane derived NAD stabiliser

A two-liter reactor containing a mechanical stirrer, fitted with a thermometer, and a Dean Stark apparatus topped by a condenser, was charged with trifluoroacetic acid (2.50 g, 21.9 millimoles), potassium acetate (1.30 g, 13 mmoles), toluene (800 ml), a polyether polyol (1000 g, glycerol started, PO: 85%, EO: 15%, MW: 5000, OH Number: 35.5 mg KOH/g, BP Product Polyurax U10-02) and vinyltriethoxy silane (12.0 g, 75 mmoles).

The reaction mixture was then heated at 110° C. during which the transetherification reaction between the polyether polyol and the vinyltriethoxysilane started producing as products the NAD stabiliser and ethanol. At 110° C. a toluene/ethanol azeotrope started to boil and was removed by distillation through the Dean Stark apparatus. By monitoring the levels of ethanol in the distillate using gas chromatography, it was found that the reaction was practically complete after 2 hours. The mixture was then cooled down to 60° C., and neutralized with sodium bicarbonate (2.60 g, 31 mmoles). Toluene was then removed and the product, filtered, had an OH number of 30.6 mg KOH/g. an acid number of 0.78 mg KOH/g,, a viscosity of 6000 cps at 25° C. and an average MW of 12300 used as such without further neutralization. It has an OH number of 40.0 mg KOH/g.

EXAMPLE 2

Solventless preparation of a NAD stabiliser

A two-liter reactor fitted with a mechanical stirrer, a thermometer, a temperature regulating device, a nitrogen supply and a condensor, was charged with a polyether polyol (1000 G, 0.212 mols, glycerol started, PO: 85% ED: 15%, MW: 5000) and degassed for 30 minutes at 100° C. under 1 mm HG vacuum. The reaction content was cooled to 60° C. and further charged with potassium acetate (0.12 g, 0.0015 mols) and vinyltrimethoxy silane (12.6 g, 0.085 mols).

The mixture temperature was raised to 140° C. under 150 ml/minute nitrogen flow for 8 hours. The entrained gasses being vented to atmosphere.

The reactor content was cooled to room temperature, the product polyether polyol was colourless and had a viscosity of 5720 cps at 25° C., a residual unsaturation of 0.15 M/Q per gram.

EXAMPLE 3

Solventless catalyst free preparation of a NAD stabiliser

A one-liter autoclave fitted with a mechanical stirrer, a thermometer and heat exchanger means was charged with the same polyether polyol (798.2 g, 0.170 mols) as in Example 2 and degassed at 2 MMHG vacuum at 90° C. for 30 minutes. The autoclave was then purged with a slight nitrogen flow for 10 minutes charged with vinyltrimethoxy silane (16.62 g, 0.112 mols) and closed in without catalyst addition. The charge was heated at 140° C. over 4 hours and then cooled down. The resulting product had the following analysis, viscosity cps at 20° C.: 840. Total unsaturation: (0.186 MEQ/G).

EXAMPLE 4

Production of modified silicone crosslinker (vinylsiloxane)

A two-liter reactor fitted with a mechanical stirrer, a thermometer, a temperature regulating device, and a condensor was charged with vinyltrimethoxysilane (300 g, 2.08 mols), octamethyltetrasiloxane (700 g, 9.46 mols dimethylsiloxane equivalents) and KOH (0.5 g, 0.0086 mols, 500 ppm). The reactor content was heated to 140° C. for 8 hours under slight reflux and cooled without further treatment of the equilibrate. The product had a viscosity at 21° C. of 6.6 cps and had the formula $CH_2=CH-Si((O(CH_3)_2)_nOCH_3)_3$.

EXAMPLE 5

Solventless preparations of NAD stabilizers based on the modified silicone crosslinker of Example 4

Two NAD stabilisers were prepared using the procedure described in Example number 2. The charge and analysis were:

| Composition Properties of Products | Sample 1 | Sample 2 |
| --- | --- | --- |
| Polyether polyol Example 2 (g) | 1000 | 1000 |
| Vinylsiloxane from Example 4 (g) | 34.98 | 41.98 |
| Potassium acetate (g) | 0.125 | 0.125 |
| Viscosity (CKS at 20° C.) | 3500 | 5250 |

EXAMPLE 6

Solventless preparation of NAD stabilisers based on monols

Two NAD stabilisers were prepared according to the procedure described in Example 2 except that the alcohol was a polyether monol (butanol started, PO: 50%, EO: 50%, MW: 2.800).

| Composition | Sample No. 1 | Sample No. 2 |
| --- | --- | --- |
| Polyether monol (2800 MW) (G) | 1,000 | 1,000 |
| Vinyltrimethoxysilane (G) | 12.6 | 14.5 |
| Potassium acetate (G) | 0.120 | 0.120 |
| Product Analysis | | |
| Viscosity (CPS at 25° C.) | 1.570 | 3,000 |
| Total unsaturation (MEQ/G) | 0.09 | 0.06 |

EXAMPLE 7

Solventless preparation of NAD stabilisers based on an unsaturated monol

Two NAD stabilisers were prepared using the procedure described in Example 2 except that the alcohol was an unsaturated polyether mono (allylalcohol started, PO: 60%, EO: 40%, MW: 4,000).

| Composition | Sample No. 1 | Samples No. 2 |
| --- | --- | --- |
| Unsaturated monol polyether (G) | 1,000 | 1,000 |
| Vinyltrimethoxysilane (G) | 12.3 | 18.5 |
| Potassium acetate (G) | 0.12 | 0.12 |
| Analysis Viscosity (CPS at 25° C.) | 0.20 | 0.26 |

EXAMPLE 8

Solventless preparation of a NAD stabiliser based on vinylmethyldimethoxysilane

Two NAD stabilisers were prepared using the procedure described in Example 2 except that the silicon atom containing compound was vinylmethyldimethoxysilane.

| Composition | Sample No. 1 | Sample No. 2 |
| --- | --- | --- |
| Polymer polyol of 5,000 MW (G) | 1,000 | 1,000 |
| Vinylmethyldimethoxy silane (G) | 13.7 | 19.6 |
| Potassium acetate | 0.12 | 0.12 |
| Analysis | | |
| Viscosity (CPS at 25° C.) | 2,900 | 3,000 |
| Total unsaturation (MEQ/G) | 0.14 | 0.16 |

EXAMPLE 9

Preparation of polymer/polyol

A one-liter reactor equipped with a thermometer, stirrer, graduated dropping funnel and heat exchange means, was charged with a blend of a base polyether (210 g, glycerol started, PO: 86% EO: 14%, MW: 3500, OH Number: 46.0 mg KOH/g. BP Product: Polyurax U10-01) and the NAD stabiliser of Example 1 (26.5 g, 5%). With stirring and under a slight nitrogen flow, the charge was heated to 125° C., and a stream of styrene (141.2 g, 26.6%), acrylonitrile (60.5 g, 12%), and a polymerization initiator (Perkadox P-16a product sold by Akzo Chimie, 2.65% g, 0.5%), dispersed in the above described base polyether (90.0 g), was continuously added to the charge during a period of two hours. Upon completion of addition, the reaction mixture was maintained at 125° C. for 1 hour. The reaction mixture was then stripped of volatiles for two hours at 110° C., under less than 10 mm of mercury. The stripped reaction product, a white opaque stable dispersion, had a viscosity of 9000 cps at 25° C.

Comparative Experiment A-Preparation of polymer/polyol

In a one-liter reactor equipped as described above, was charged a base polyether polyol (210 g of the polyether polyol in above example, without any added stabiliser). With stirring and under a slight nitrogen flow, the charge was heated to 125° C., and a stream of styrene (90.65 g, 21%), acrylonitrile (38.85 g, 9%) and a polymerisation initiator (Perkadox P-16, 2.65 g, 0.5%) dispersed in the above described polyether (90.0 g) was continuously added to the charge during two hours period. Before completion of the addition, a completely coagulated mass of polymer was obtained, blocking the stirrer.

EXAMPLE 10

Batch preparation of a polymer polyol dispersion, polymer content 23%, styrene
Acrylonitrile = 70:30

A two-liter reactor equipped with a stirrer, thermometer and heat exchanger, and a graduated dropping funnel, was charged with a base polyether (597 g, 47.78 weight percent, MW: 5000).

While stirring under a slight nitrogen flow, the charge was heated to 125° C., and a stream of:

(a) NAD stabiliser (62.5 g, S.O w/w percent, product from Example No. 2);

(b) Azo-bis-isobutyronitrile (4.4 g, 0.35 w/w percent, e.g. AZDN-LMC from FBC Limited);

(c) Styrene (201.3 g), 16.11 w/w percent) and acrylonitrile (86.3 g), 6.9 w/w percent), dispersed in the above described base polyether (298 g, 23.85 w/w percent) was continuously added to the charge during a period of 30 minutes.

Upon completion of addition, the reaction mixture was maintained at 125° C. for 30 minutes.

The resulting polymer/polyol dispersion had the following analysis:

Viscosity CPS at 25° C. (unstripped): 2,800; (stripped at 135° C.): 3,000.

Filtration hindrance: 150 mesh: 100% pass in 15 seconds; 700 mesh: 98% pass in 300 seconds.

EXAMPLE 11

Preparation of polymer/polyol dispersion

A polymer dispersion was prepared using as base polyether a Polyurax Polyol U10-02 (glycerol starter, PO: 65%, EO: 15%, MW: 5000, OH Number: 35.5 mg KOH/g) and as a stabiliser the polyol of Example 1 (13.1% on base polyether). The polymer polyol dispersion was prepared by a continuous process in which a premix of total weight (50 kg) comprising polyether polyol/styrene/acrylonitrile/catalyst was prepared in a stirred container and then fed by means of a metering pump, to a jacketted continuous stirred tank reactor (CSTR) of capacity (approximately 2 liters) maintained at a reaction temperature of 125° C.±5° C., over a period of approximately 8 hours. The reactor fitted with an external cooling loop with heat exchanger and pumped recirculation (capacity approximately 2 liters) to assist in controlling reaction temperature.

The contents from the reactor then passed to a secondary reactor in the form of a jacketted tube (unstirred), capacity approximately 4 liters, the system being maintained at the same temperature and a positive pressure of 5 psig by means of a back pressure valve, before being collected in a receiving vessel at atmospheric pressure. Prior to commencing the premixed feed to the stirred reactor, the system was filled with polymer/polyol dispersion containing 20% of total polymer, and already heated to, and maintained at, 125° C.

The resulting polymer dispersion had the following analysis:

| | | | | |
| --- | --- | --- | --- | --- |
| Polystyrene (PS) (%) | : | 29.6 | | |
| Polyacrylonitrile (PAN) (%) | : | 10.8 | | |
| Total Polymer (%) | : | 40.4 | | |
| Filtration hindrance: 7 | 10 | | | |
| 150 mesh 100% Pass (s) | 13 | 14 | | 14 |
| 700 mesh (%) Pass | 17 | 06 | | 11 |

| | |
|---|---|
| -continued | |
| RT: Residence time number | |
| Viscosity (cps, 25° C.) | : 4870 |

EXAMPLE 12

All polystyrene polymer dispersion

A one-liter reactor equipped as described in Example 2, was charged with a blend of a base polyether (of Example 2, 190 g), and the stabiliser of Example 1 (24.0 g, 5%). With stirring and under a slight nitrogen flow, the charge was heated to 125° C., and a stream of styrene (202 g, 42%), and a polymerization initiator (Perkadox P-16, 480 g, 1%) dispersed in the above described base polyether (60 g) was continuously added to the charge during two hours period. Upon completion of addition, the reaction mixture was maintained at 125° C. for 1 hour. The reaction mixture was then stripped of volatiles for two hours at 110° C., under less than 10 mm of mercury. The stripped reaction product, a white opaque stable dispersion, had a polymer content of 41% (analysed by centrifugable solids) and a viscosity of 3500 cps at 25° C.

EXAMPLE 13

Continuous preparation of a polymer polyol dispersion S/AN: 70/30, polymer content 23%

A polymer dispersion was made using the same composition as for Example 10, but was polymerised according to a continuous process as described below.

A premix of 5.1 kg comprising a polyether polyol (3,678 g, 71.95%, MW: 5000), a NAD stabiliser (255 g, 4.99%, e.g. product from Example 2), acrylonitrile (360 g, 7.04%), styrene (800 g, 15.65% and AIBM (19.25 g, 0.37%) was prepared in a stirred container and then fed by means of a metering pump to a jacketted continuous stirred tank reactor (CSTR) of 0.2 liter capacity, maintained at 125°+/−5° C., over a period of approximately 8 hours. The CSTR was fitted with an external heat exchanger. The contents from the reactor were then passed to a secondary reactor formed by an unstirred jacketted tube of 0.4 liter capacity, maintained at 125°+/−° C., and at a positive pressure of 5 psig before being collected in a receiving vessel at atmospheric pressure. Prior to commencing the premix feed to the stirred reactor, the system was filled with polymer polyol dispersion containing 13% of total polymer which had been previously heated to 125° C.

The resulting polymer polyol dispersion was homogeneous and after 7 residences times had the following analysis:

Viscosity: (CPS at 25° C.): 2,240.

Filtration hindrance: 150 mesh: 100% pass in 16 seconds; 700 mesh: 100% pass in 300 seconds.

COMPARATIVE EXAMPLE B

Batch preparation of a polymer polyol dispersion without NAD stabiliser

Example 10 was repeated except that the NAD stabiliser was omitted. The same procedure as described in Example No. 10, resulted in a non homogeneous, lumpy reaction mixture.

EXAMPLE 14

Preparation of polymer polyol dispersions from the NAD stabilisers of Example 5

Polymer polyol dispersions were prepared according to the batch or continuous procedures described in Examples 10 and 13 respectively. The resulting polymer polyol dispersions were homogeneous and had the following analyses.

| | NAD stabiliser | |
|---|---|---|
| | Sample 1 of Example 5 | Sample 2 of Example 5 |
| Filtration Hindrance after batch polymerisation: | | |
| 150 mesh | 100% pass in 45 seconds | 100% pass in 64 seconds |
| 700 mesh | 12% pass in 300 seconds | 30% pass in 300 seconds |
| Filtration hindrance after continuous polymerisation | | |
| 150 mesh | 100% pass in 16 seconds | — |
| 700 mesh | 65% pass in 300 seconds | — |

EXAMPLE 15

Preparation of polymer polyol dispersions from the NAD stabilisers from Example 6

Polymer polyol dispersions were prepared according to the batch polymerisation procedure described in Example 10. The resulting polymer polyol dispersions were homogeneous and had the following analysis:

| | NAD stabiliser | |
|---|---|---|
| Filtration hindrance | Sample 1 of Example 6 | Sample 2 of Example 6 |
| 150 mesh | 60% pass in 60 seconds | 76% pass in 300 seconds |
| Viscosity (CPS at 25° C.) | 2,540 | |

EXAMPLE 16

Preparation of polymer polyol dispersions from the NAD stabilisers from Example 7

Polymer polyol dispersions were prepared according to the batch polymerisation procedure described in Example 10. The resulting polymer polyol dispersions were homogeneous and had the following analyses:

| | NAD stabiliser | |
|---|---|---|
| Filtration hindrance | Sample 1 of Example 7 | Sample 2 Example 7 |
| 150 mesh | 100% pass in 300 seconds | 45% pass in 300 seconds |

EXAMPLE 17

Batch preparation of a polymer polyol dispersion from the NAD stabiliser of Example 3

A polymer polyol dispersion was made with the same charge and procedure as in Example 10, except that the NAD stabiliser used was the product from Example 3.

The resulting polymer polyol dispersion was homogeneous and 75% of a sample passed through a 150 mesh filter.

EXAMPLE 18

Preparation of polymer polyol dispersions from the NAD stabilisers from Example 8

Polymer polyol dispersions were prepared according to the batch polymerisation procedure described in Example 10. The resulting polymer polyol dispersions were homogeneous and had the following analysis:

| Filtration hindrance | NAD stabiliser | |
|---|---|---|
| | Sample 1 of Example 8 | Sample 2 of Example 8 |
| 150 mesh | 65% pass in 300 seconds | 100% pass in 16 seconds |
| 700 mesh | — | 18% pass in 300 seconds |

We claim:

1. A modified alcohol suitable for use as an NAD stabiliser characterised in that the modified alcohol is the reaction product obtained by reacting a silicon atom containing compound of the formula

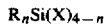

wherein the R groups are independently selected from the group consisting of $C_1$-$C_{20}$ linear alkyl groups, $C_1$-$C_{20}$ branched alkyl groups, $C_4$ to $C_{20}$ cycloalkyl groups, substituted or unsubstituted phenyl or benzyl groups and vinyl groups, at least one R group being a vinyl group; X is a $C_1$-$C_{10}$ alkoxy group and n is an integer from 1 to 3, with a polyether polyol having an average molecular weight in excess of 400 and a hydroxyl number in the range 20 to 280.

2. A modified alcohol as claimed in claim 1 characterised in that the silicon compound is vinyltriethoxysilane, or vinyltrimethoxylsilane.

3. A modified alcohol as claimed in claim 1 characterised in that the silicon compound has the formula $R_nSi((-OSi(R^1)_2)_pX)_{4-n}$ wherein
   (a) n is an integer from 1 to 3;
   (b) the R groups are as defined in claim 1;
   (c) p is an integer greater than zero;
   (d) $R^1$ is a hydrocarbyl radical, and
   (e) the X groups are as defined in claim 1.

4. A modified alcohol as claimed in claim 1, wherein all the R groups on the silicon atom containing compound are vinyl groups.

5. A modified alcohol as claimed in claim 1, wherein the silicon atom compound is vinyl methyl dimethoxysilane.

6. A modified alcohol as claimed in claim 1, wherein the polyether polyol is a polyethylene oxide, polypropylene oxide or poly(ethylene/propylene) oxide adduct of a polyhydric alcohol selected from the group consisting of glycerol, trimethylolpropane, diethylene glycol, isomeric butanetriols, isomeric pentanetriols, isomeric hexanetriols, and pentaerythritol.

7. A modified alcohol as claimed in claim 1, wherein the viscosity of the modified alcohol is in the range 500–4,000 cps at 25° C.

8. A modified alcohol as claimed in claim 1, wherein the NAD stabiliser has 0.3% to 0.7% by weight induced unsaturation.

* * * * *

UNITED STATES PATENT AND TRADEMARK OFFICE
CERTIFICATE OF CORRECTION

PATENT NO. : 4,723,026

DATED : February 2, 1988

INVENTOR(S) : RUDOLPHE C. CLOETENS, WERNER A. LIDY and HUY P. THANH

It is certified that error appears in the above-identified patent and that said Letters Patent is hereby corrected as shown below:

Col. 9, line 38, change "AIBM" to -- AIBN --.

Signed and Sealed this

Fifth Day of July, 1988

Attest:

DONALD J. QUIGG

Attesting Officer

Commissioner of Patents and Trademarks